(12) United States Patent
Karlsson et al.

(10) Patent No.: US 10,910,948 B2
(45) Date of Patent: Feb. 2, 2021

(54) VOLTAGE DROOP CONTROL IN A VOLTAGE-REGULATED SWITCHED MODE POWER SUPPLY

(71) Applicant: Telefonaktiebolaget LM Ericsson (publ), Stockholm (SE)

(72) Inventors: Magnus Karlsson, Oskarshamn (SE); Marko Leskovec, Nybro (SE); Jonas Malmberg, Färjestaden (SE); Fredrik Wahledow, Färjestaden (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 151 days.

(21) Appl. No.: 16/092,873

(22) PCT Filed: Apr. 11, 2016

(86) PCT No.: PCT/EP2016/057886
§ 371 (c)(1),
(2) Date: Oct. 11, 2018

(87) PCT Pub. No.: WO2017/178035
PCT Pub. Date: Oct. 19, 2017

(65) Prior Publication Data
US 2019/0207517 A1 Jul. 4, 2019

(51) Int. Cl.
*H02M 3/158* (2006.01)
*H02M 1/36* (2007.01)
(Continued)

(52) U.S. Cl.
CPC .......... *H02M 3/1584* (2013.01); *H02M 1/08* (2013.01); *H02M 1/36* (2013.01); *H02M 3/156* (2013.01); *H02M 2001/0025* (2013.01)

(58) Field of Classification Search
None
See application file for complete search history.

(56) References Cited

U.S. PATENT DOCUMENTS 7,577,006 B2 8/2009 Neacsu
2005/0194952 A1 9/2005 Carpenter et al.
(Continued)

FOREIGN PATENT DOCUMENTS

WO 2017178035 A1 10/2017

OTHER PUBLICATIONS

Augustine, Sijo, et al., "Adaptive Droop Control Strategy for Load Sharing and Circulating Current Minimization in Low-Voltage Standalone DC Microgrid", IEEE Transactions on Sustainable Energy, vol. 6, No. Jan. 1, 2015, pp. 132-141.
(Continued)

*Primary Examiner* — Jue Zhang
*Assistant Examiner* — Henry E Lee, III
(74) *Attorney, Agent, or Firm* — Boisbrun Hofman, PLLC

(57) ABSTRACT

A controller for a switched mode power supply (SMPS) including a reference voltage signal generator to generate a variable reference voltage signal for regulating an output voltage of the SMPS, and a voltage droop control signal generator to receive a current indicator signal indicative of an output current of the SMPS, and generate an output voltage droop control signal in response to a first function and a second function of the current indicator signal. The first function is employed when the reference voltage signal generator ramps the variable reference voltage signal, and the second function is employed thereafter. The controller includes a switching control signal generator to receive a voltage indicator signal, and to generate a control signal to regulate the output voltage of the SMPS based on the voltage indicator signal, the variable reference voltage signal, and the output voltage droop control signal.

20 Claims, 8 Drawing Sheets

(51) Int. Cl.
*H02M 3/156* (2006.01)
*H02M 1/08* (2006.01)
*H02M 1/00* (2006.01)

(56) References Cited

U.S. PATENT DOCUMENTS

2012/0043946 A1   2/2012   Wei et al.
2016/0233766 A1*  8/2016   Todorov .............. H02M 3/1584

OTHER PUBLICATIONS

"Optimized Droop Function for Current Sharing", The Industry Standard Disclosure Publication Service, ResearchDisclosure.com, Research database No. 614057, Published in the Jun. 2015 paper journal, Published digitally on May 21, 2015, 5 pages.
PCT/EP2016057886 International Search Report and Written Opinion of the International Searching Authority dated Jan. 24, 2017, 10 pages.

* cited by examiner

VOLTAGE DROOP CONTROL IN A VOLTAGE-REGULATED SWITCHED MODE POWER SUPPLY

CROSS-REFERENCE TO RELATED APPLICATION

This application is the National Stage of, and therefore claims the benefit of, International Application No. PCT/EP2016/057886 filed on Apr. 11, 2016, entitled "VOLTAGE DROOP CONTROL IN A VOLTAGE-REGULATED SWITCHED MODE POWER SUPPLY". The above application is commonly assigned with this National Stage application and is incorporated herein by reference in its entirety.

TECHNICAL FIELD

The present invention generally relates to the field of switched mode power supplies (sometimes referred to as switch mode power supplies or switching mode power supplies) and more specifically to the control of voltage droop in an output voltage-regulated switched mode power supply.

BACKGROUND

The switched mode power supply (SMPS) is a well-known type of power converter having a diverse range of applications by virtue of its small size and weight and high efficiency, for example in servers, personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted using a feedback signal to convert an input voltage to a desired output voltage. A SMPS may take the form of a rectifier (AC/DC converter), a DC/DC converter, a frequency changer (AC/AC) or an inverter (DC/AC).

If the power output capability of a single SMPS is not sufficient for a given application, it may be possible to connect multiple SMPSs in parallel to supply power to a load via a common output rail. SMPSs that are not output voltage-regulated (especially diode-rectified DC/DC converters) are well-suited to load current sharing arrangements of this kind, since the parasitic resistance in the power train of each SMPS usually causes the converter's output voltage to decrease as the converter's output current increases, i.e. a natural output voltage droop is present. The droop exhibited by each SMPS facilitates current sharing with other SMPSs in the system by effectively regulating the output voltage of the SMPS so as to counter any imbalance between the SMPS's output current and the output currents of the other SMPSs in the system. Thus, the voltage droop characteristic allows the paralleled SMPSs to share the task of supplying current to their load evenly. Load sharing in such a system of paralleled SMPSs may be improved by increasing the amount of voltage droop exhibited by each SMPS, and taking care to set the initial setting of each SMPS (i.e. output voltage at zero load current) appropriately.

However, there are many SMPS applications in which the SMPS output voltage to be supplied to load circuitry (e.g. a CPU) must be regulated so as to remain within a (usually very narrow) voltage band. Output voltage regulation may be achieved, for example, by feeding a signal indicative of the SMPS output voltage back to a pulse width modulation (PWM) controller of the SMPS, which monitors the feedback signal and adjusts the switching duty cycle of the SMPS's switching element(s) so as to maintain the output voltage at a predetermined value, regardless of the load current level. Alternatively, a switching frequency controller may be used instead of a PWM controller, to control the switching frequency of the SMPS's switching element(s) so as to maintain the output voltage at a predetermined value, regardless of the load current level. Owing to their wide availability, it is also often desirable to run voltage-regulated SMPSs in parallel to feed load circuits having high power demands. However, the absence of a natural output voltage droop makes it difficult to maintain even current sharing among the SMPSs in such parallel systems, and it therefore becomes necessary to introduce some form of artificial voltage droop in the SMPSs. A simplified example of how a regulated SMPS may be provided with artificial droop will now be explained with reference to FIG. 1.

FIG. 1 is a schematic of a conventional SMPS 100, which comprises a voltage conversion circuit 10 having one or more switching devices (e.g. MOSFETs) that are controlled to switch between conducting ("ON") and non-conducting ("OFF") states with a switching duty cycle, D, determined by a PWM controller 20.

As shown in FIG. 1, the PWM controller 20 comprises a reference voltage signal generator 21 for generating a reference voltage signal, $S_{ref}$, and is configured to receive and process an output voltage indicator signal, $S_{Vout}$, which is indicative of the output voltage of the SMPS 100, $V_{out}$. For any given load current, $I_{out}$, of the SMPS 100, the PWM controller 20 is configured to determine the duty cycle D required to maintain $V_{out}$ at a predetermined level based on the generated reference voltage signal $S_{ref}$ and the received output voltage indicator signal $S_{Vout}$. During start-up of the SMPS 100, the reference voltage signal generator 21 is configured to ramp up the reference voltage signal $S_{ref}$ from an initial value (typically zero) to a pre-defined level that is required to achieve a desired output voltage $V_{out}$ during normal operation of the SMPS 100, and to maintain the reference voltage signal $S_{ref}$ at the pre-defined level after the ramp has finished.

The PWM controller 20 is also provided with a voltage droop control signal generator 22 for controlling the PWM controller 20 to exhibit an artificial voltage droop. More specifically, the voltage droop control signal generator 22 is configured to receive a current indicator signal, $S_I$, which is indicative of the output current $I_{out}$ of the SMPS 100, and to generate, based on the received current indicator signal $S_I$, an output voltage droop control signal, $S_{droop}$, for adjusting an output voltage set-point (i.e. an output voltage target value) used by the PWM controller 20 to regulate $V_{out}$. In the present example, the voltage droop control signal generator 22 generates the output voltage droop control signal $S_{droop}$ simply by scaling values of the received current indicator signal $S_I$ by a predetermined constant. In other words, a fixed, linear droop function is used to generate the droop control signal $S_{droop}$ on the basis of the current indicator signal $S_I$.

The current indicator signal $S_I$ may be generated in any suitable or desirable way known to those skilled in the art. For example, the current indicator signal $S_I$ may be generated by a current sensing circuit (not shown) within the voltage conversion circuit 10, which may be configured to measure the voltage drop across a resistive component (e.g. conductive track carrying some or all of the SMPS's output current) or a dedicated shunt resistor connected to the output of the SMPS 100, such that the voltage droop control signal generator 22 receives said voltage drop as the current indicator signal $S_I$. However, the use of a current shunt to measure $I_{out}$ has the draw-backs of degrading the thermal coupling of the voltage conversion circuit 10 to the output pin(s) of the SMPS 100, and decreasing SMPS efficiency through resistive losses. In switched mode power supplies where an output choke is present (e.g. in Forward-topology DC/DC converters, among others), these problems may be avoided by making a "lossless" current measurement as described, for example, in "A Simple Current-Sense Technique Eliminating a Sense Resistor" (Linfinity Application Note AN-7, Rev. 1.107/1998).

The PWM controller 20 further comprises a switching control signal generator 23, which is arranged to receive the output voltage indicator signal, $S_{Vout}$, and generate, based on: (i) $S_{Vout}$; (ii) the reference voltage signal $S_{ref}$; and (iii) the output voltage droop control signal $S_{droop}$, a control signal $S_C$ for controlling the switching of the voltage conversion circuit 10 to regulate the output voltage $V_{out}$ of the SMPS 100.

For example, the switching control signal generator 23 may, as in the present example, comprise an error signal generator 24 for generating an error signal, $S_{error}$, based on the reference voltage signal $S_{ref}$, the voltage indicator signal $S_{Vout}$, and the output voltage droop control signal $S_{droop}$. More particularly, the error signal generator 24 generates an error signal $S_{error}$ such that $S_{error} = S_{ref} - S_{Vout} - S_{droop}$. As noted above, the droop control signal $S_{droop}$ is a linear function of the current, $I_{int}$, indicated by the current indicator signal $S_I$, so that $S_{droop} = R_d I_{int}$, where $R_d$ is a constant. The switching control signal generator 23 may, as in the present example, also have an output voltage regulator 25, which may be provided in any suitable or desirable from (e.g. a PID regulator), and which determines the switching duty cycle D based on $S_{error}$, in accordance with a set control law (in this example, PID). The switching control signal generator 23 may further comprise a PMW module 26 that generates, based on the output of the regulator 25, the control signal $S_C$ for controlling the switching of the switch(es) in the voltage conversion circuit 10 that is/are under its control.

SUMMARY

The present inventors have recognised that, in power supply systems having paralleled conventional switched mode power supplies of the kind described above, current sharing accuracy tends to be poor while the output voltages of the switched mode power supplies are being ramped, for example during start-up of the switched mode power supplies. This current sharing imbalance may be particularly noticeable when the switching of the paralleled switched mode power supplies is not synchronised; in this case, differences between the clock (i.e. switching) frequencies of the switched mode power supplies can lead to differences in the ramping times between the switched mode power supplies, causing significant voltage differences and a corresponding current imbalance to occur.

FIG. 2 is a schematic illustrating respective output voltage variations, Var1 and Var2, typically observed during start-up for two SMPSs having slightly different clock frequencies. The difference between the clock frequencies causes a large output voltage difference during the ramp. However, after the output voltages have been ramped up to their (common) target values (at time $T_{ramp1}$ for Var1, and time $T_{ramp2}$ for Var2), the smaller voltage difference that can be observed in FIG. 2 is due to the initial setting of the reference voltages and differences in output voltage measurement accuracy in the two SMPSs (among other factors).

The present inventors have recognised that, although the maximum amount of output voltage droop of an SMPS is often limited during normal operation (i.e. after its output voltage has been ramped up) by the voltage requirements of the SMPS load (which may require the output voltage of the SMPS to remain within a certain range), no such limits on the amount of artificial droop generated usually have to be observed while the output voltage is being ramped, so that the amount of droop applied during the ramp may be greater than that applied after the ramping of the output voltage has finished. In other scenarios, it may be preferable to make the amount of droop applied during the ramp smaller than during normal operation, for example in power supply systems in which the contributions of the paralleled SMPSs to the system's output current are prone to oscillations during the ramp.

Based in this insight, the present inventors have devised a scheme of controlling an SMPS that allows its voltage regulation to be based on one droop function while the SMPS's output voltage is being ramped, and on another, different droop function after the ramp is complete.

More specifically, the inventors have devised a controller for controlling the switching of an SMPS to regulate an output voltage of the SMPS. The controller comprises a reference voltage signal generator for generating a variable reference voltage signal for regulating the output voltage of the SMPS, the reference voltage signal generator being configured to ramp the reference voltage signal. The controller further comprises a voltage droop control signal generator for receiving a current indicator signal that is indicative of an output current of the SMPS, the voltage droop control signal generator being configured to generate, based on the received current indicator signal, an output voltage droop control signal for regulating the output voltage of the SMPS. The controller further comprises a switching control signal generator for receiving a voltage indicator signal indicative of the output voltage of the SMPS, the switching control signal generator being configured to generate, based on the voltage indicator signal, the reference voltage signal and the output voltage droop control signal, a control signal for controlling the switching of the SMPS to regulate the output voltage of the SMPS. The voltage droop control signal generator is configured to generate the output voltage droop control signal as a first function of the received current indicator signal when the reference voltage signal generator is ramping the reference voltage signal, and to generate the output voltage droop control signal as a second function of the received current indicator signal when the reference voltage signal generator has finished ramping the reference voltage signal, the second function being different from the first function.

The inventors have further devised a switched mode power supply comprising a controller as set out above.

The inventors have further devised a power supply system comprising a plurality of switched mode power supplies that are connected in parallel so as to be capable of supplying power to a common load, wherein at least one of the switched mode power supplies comprises a controller as set out above.

The inventors have further devised a method of controlling the switching of an SMPS to regulate an output voltage of the SMPS. The method comprises: ramping a reference voltage signal for regulating the output voltage of the SMPS; monitoring a current indicator signal that is indicative of an output current of the SMPS; monitoring a voltage indicator signal indicative of the output voltage of the SMPS; generating a first output voltage droop control signal as a first function of the monitored current indicator signal while the reference voltage signal is being ramped; generating, based on the reference voltage signal, the monitored voltage indicator signal, and the generated first output voltage droop control signal, a control signal for controlling the switching of the SMPS to regulate the output voltage of the SMPS during the ramp of the reference voltage signal; ceasing to ramp the reference voltage signal; generating a second output voltage droop control signal as a second function of the monitored current indicator signal, the second function being different from the first function; and generating, based on the reference voltage signal, the monitored voltage indicator signal, and the generated second output voltage droop control signal, a control signal for controlling the switching of the SMPS to regulate the output voltage of the SMPS after the ramping of the reference voltage signal has ceased.

The inventors have further devised a computer program product, comprising a signal or a non-transitory computer-readable storage medium carrying computer program instructions which, when executed by a processor, cause the processor to perform a method as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Figure 3:
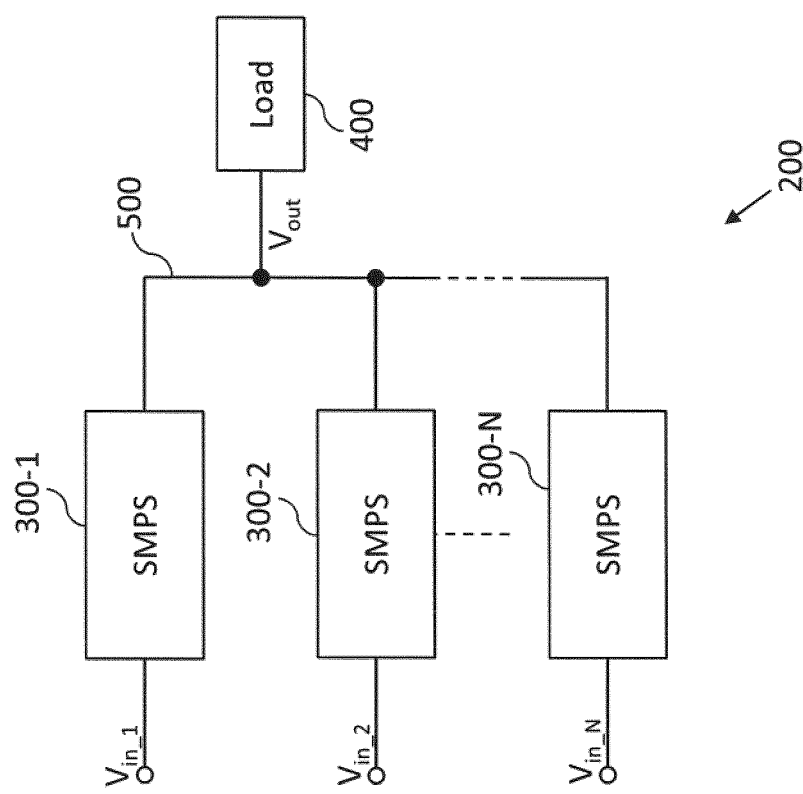
FIG. 3 shows a power supply system according to an embodiment of the present invention, which comprises a plurality of SMPSs.

FIG. 3 shows a power supply system 200 comprising a plurality of voltage-regulated SMPSs 300-1 to 300-N, each having control circuitry for providing an output voltage droop (that is, an increase in the SMPS output voltage with decreasing values of the SMPS output current) which is generated on the basis of a first droop function during a ramp of the SMPS's output voltage, and a second, different droop function after the ramp is complete. The passive droop load sharing employed in the power supply system 200 advantageously allows good current sharing to be achieved both during the voltage ramp and afterwards, without having to synchronise the switching of the SMPSs or use a current-sharing bus.

In the power supply system 200 of FIG. 3, the SMPSs 300-1 to 300-N are connected in parallel to supply power to a common load 400 via a common output rail 500. Although the SMPSs 300-1 to 300-N are arranged to convert respective input voltages $V_{in\_1}$ to $V_{in\_N}$ to respective output voltages near $V_{out}$, one or more of the SMPSs 300-1 to 300-N may alternatively be supplied with power from a common source at their inputs. The SMPSs 300-1 to 300-N all have the same configuration, which will now be described with reference to FIG. 4.

Figure 4:
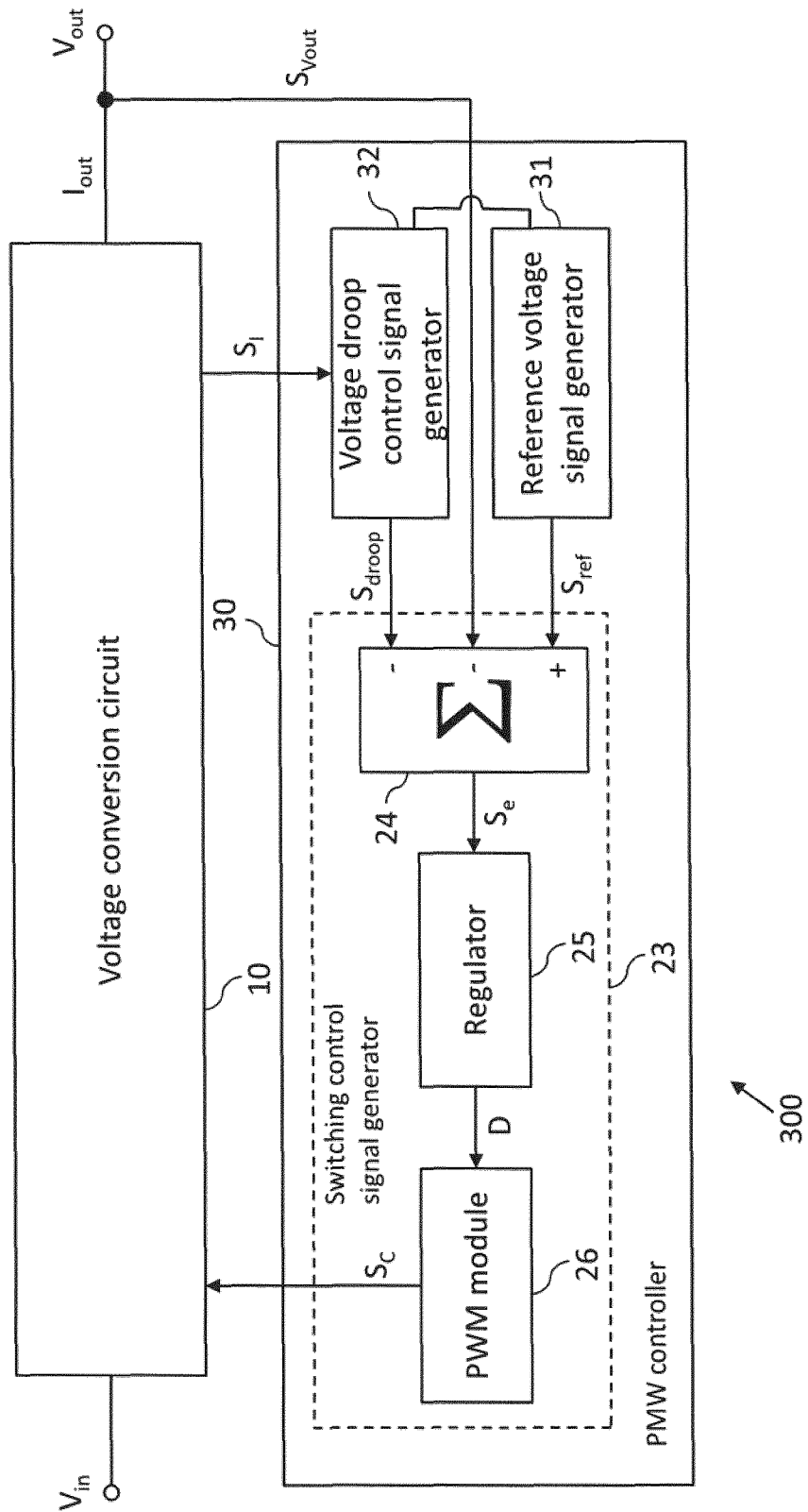
FIG. 4 shows an SMPS in FIG. 3 according to an embodiment of the present invention.

FIG. 4 shows an SMPS 300 according to an embodiment of the present invention. The SMPS 300 of the present embodiment comprises a voltage conversion circuit 10 as described above with reference to FIG. 1, which has one or more switching devices (e.g. transistors such as MOSFETs) that are connected and controlled to switch such that the SMPS 300 converts the input voltage $V_{in}$ to an output voltage $V_{out}$. The voltage conversion circuit 10 may, for example, comprise a buck converter having a single switching device and a diode, or employ a more complex arrangement. For example, if the SMPS 300 includes an isolation transformer, the voltage conversion circuit 10 may comprise a half-bridge arrangement of two switching devices, a push-pull arrangement or, in higher-power applications, a full-bridge arrangement of four switching devices on the primary side of the transformer. Those skilled in the art will appreciate that the voltage conversion circuit 10 may be configured in other ways, depending on various operational requirements.

The controller 30 of the SMPS 300 is configured to control switching of the SMPS 300 to regulate the output voltage $V_{out}$ based (among other things) on a voltage indicator signal $S_{Vout}$ that is indicative of $V_{out}$. For example, the voltage indicator signal $S_{Vout}$ may, as in the present embodiment, be a portion of the output voltage $V_{out}$ (the fraction being determined e.g. by the values of resistors of a potential divider).

Figure 1:
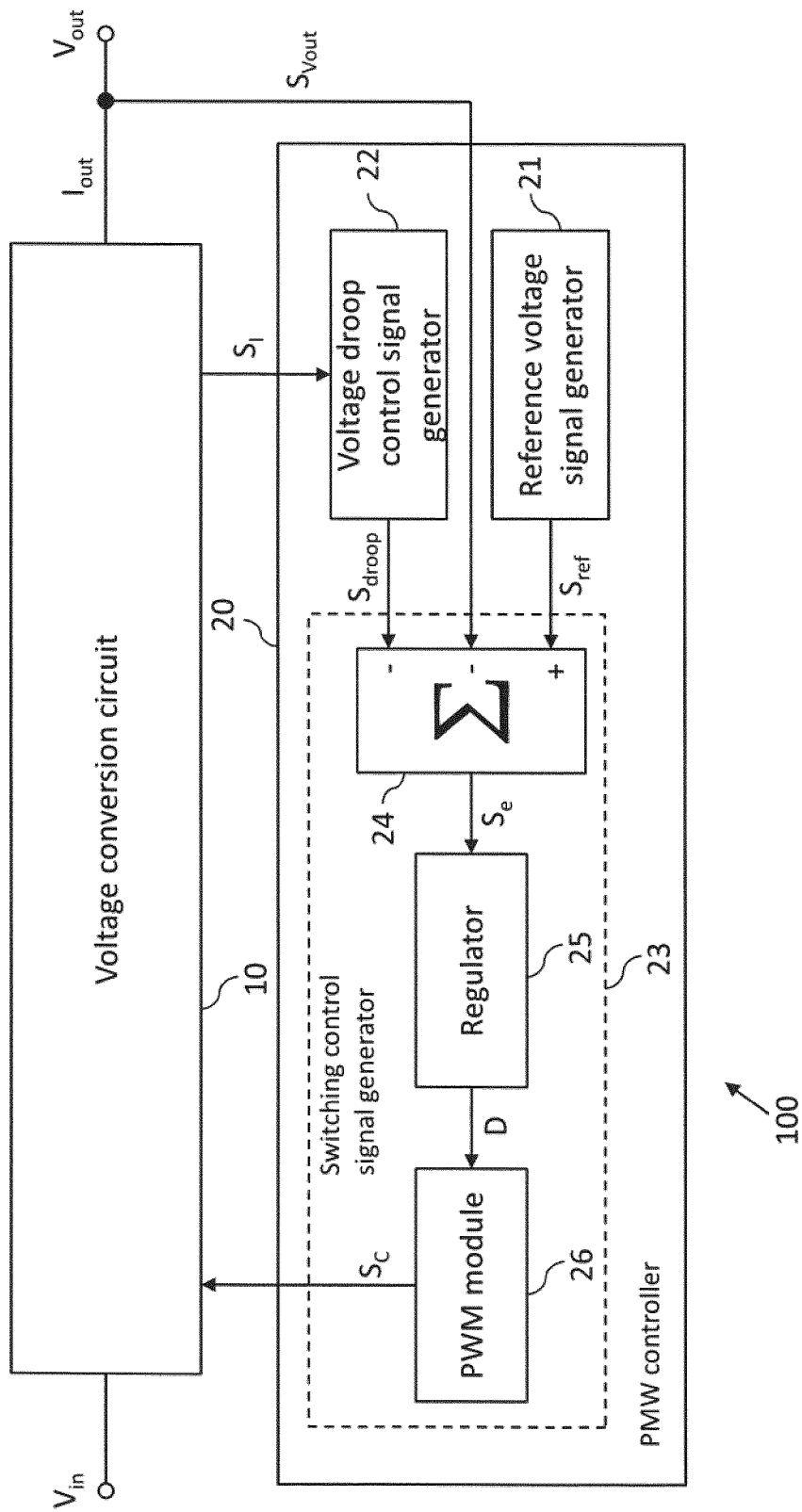
FIG. 1 is a schematic of a conventional regulated SMPS with artificial droop.
Figure 2:
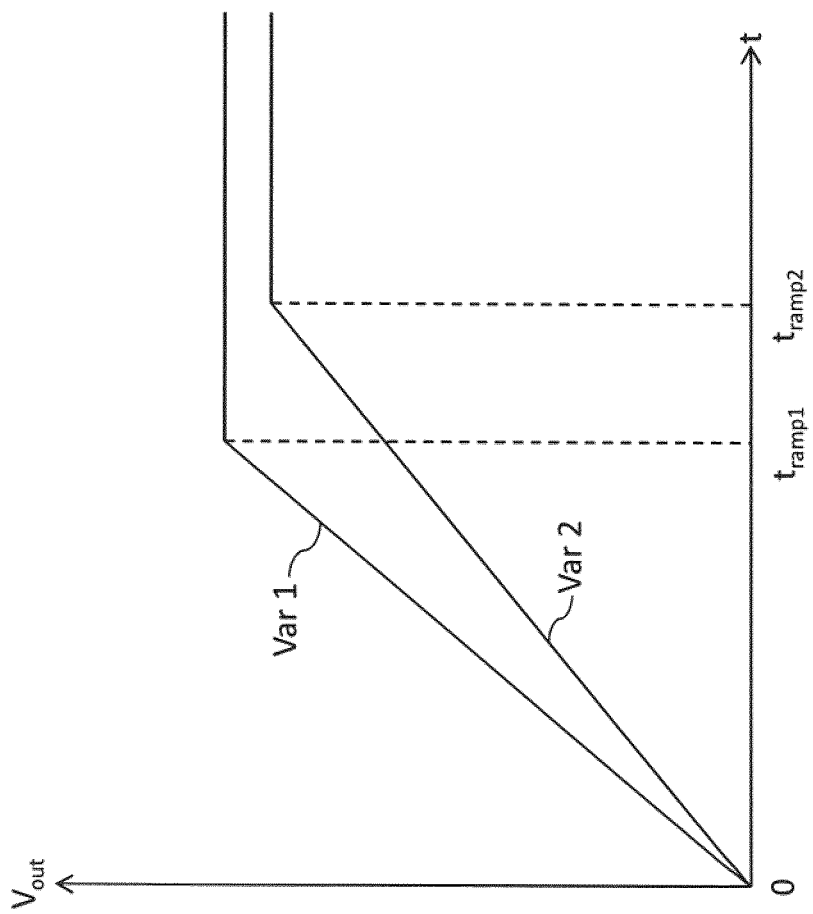
FIG. 2 is a schematic illustration of how the output voltages of two conventional SMPSs with artificial droop vary during and after a ramp of the output voltages.

In the present embodiment, the controller 30 takes, by way of example, the form of a PWM controller having a switching control signal generator 23 comprising an error signal generator 24, a regulator 25 and a PMW module 26 that are the same as in the example of FIG. 1. The description of these functional components will therefore not be repeated. However, the controller 30 differs from the PWM controller 20 shown in FIG. 1 by having a modified reference voltage signal generator 31 and a modified voltage droop control signal generator 32, whose functionalities are described below. The controller 30 uses the received signals $S_I$ and $S_{Vout}$, together with a reference voltage signal $S_{ref}$ generated by the reference voltage signal generator 31, to control switching of the voltage conversion circuit 10, via the switching control signal generator 23, in order to effectively regulate the output voltage $V_{out}$ both during a ramp of the output voltage $V_{out}$ and after the ramp has been completed.

In the present embodiment, the reference voltage signal generator 31 is configured to ramp the reference voltage signal $S_{ref}$ from an initial value (which may, as in the present case, be zero) up to a predetermined value during start-up of the SMPS 300, and then maintain the reference voltage signal $S_{ref}$ at the predetermined value during subsequent operation of the SMPS 300. The reference voltage signal generator 31 may additionally or alternatively be configured to ramp the output voltage $V_{out}$ down from the predetermined value (or any other value) during a shut-down of the SMPS 300, and/or perform an output voltage ramp (either up or down) between any two output voltage values during operation of the SMPS 300. In any case, a measurable characteristic or property of the reference voltage signal $S_{ref}$ (for example, its size, as in the present embodiment) which is indicative of a reference voltage and is to be compared against a like characteristic or property of $S_{Vout}$ and $S_{droop}$ is used during voltage regulation.

The voltage droop control signal generator 32 of the present embodiment is configured to generate the output voltage droop control signal $S_{droop}$ as a first function of the received current indicator signal $S_I$ when the reference voltage signal generator 31 is ramping the reference voltage signal $S_{ref}$, and to generate the output voltage droop control signal $S_{droop}$ as a second function of the received current indicator signal $S_I$ when the reference voltage signal generator 31 has finished ramping the reference voltage signal $S_{ref}$, the second function being different from the first function. The first and second functions may be such that, during operation of the controller 30 to control the SMPS 300, the SMPS 300 exhibits greater output voltage droop, for at least some values of the output current $I_{out}$ of the SMPS 300, when the reference voltage signal $S_{ref}$ is being ramped than after the ramping of the reference voltage signal $S_{ref}$ has finished. In other words, the first function may be greater than the second function (thus giving greater voltage droop) for only some, or all, of the values of the output current $I_{out}$ of the SMPS 300 that may be indicated by the current indicator signal $S_I$.

For example, each of the first function and the second function may be linear, with the first derivative (i.e. gradient) of the first function being greater than the first derivative of the second function; in this case, both the first and second functions may pass through the origin (i.e. each function is zero when the value of the output current indicated by the current indicator signal $S_I$ is zero). Put another way, each of the first and second function may be proportional to the current indicator signal $S_I$, with the constant of proportionality of the first function being greater than the constant of proportionality of the second function. For example, the first function may be 40 m$\Omega \cdot I_{int}$, while the second function may be 10 m$\Omega \cdot I_{int}$, where $I_{int}$ is the current indicated by the current indicator signal $S_I$.

Alternatively, one or both of the first function and the second function may be non-linear. Where the droop function is non-linear, it is preferably a monotonically increasing function, otherwise oscillating behaviour in the current-sharing may occur; this requires the first derivative of the droop function (i.e. the droop resistance) to be positive for all values of $I_{int}$ greater than zero. Simulations and measurements performed by the inventors have shown that non-linear droop functions having a first derivative that is not only greater than zero but also continuous for all values of $I_{int}$ greater than zero are particularly advantageous, as the probability of current oscillations with circulating currents is further reduced. Thus, one or both of the first and second droop functions may be non-linear and have a first derivative (with respect to $I_{int}$) which is both continuous and greater than zero for all values of $I_{int}$ greater than zero that might be indicated by the current indicator signal $S_I$.

Where the first and second droop functions are non-linear, each of these functions may be a polynomial of order (i.e. degree) 2 or more, wherein the coefficients of the polynomials are such that the first function is greater than the second function for only some values, or for all values, of the current indicator signal $S_I$. For example, in the present embodiment, the first droop function is the third-degree polynomial $a_{ramp} \cdot I_{int}^3 + b_{ramp} \cdot I_{int}$, while the second droop function is the third-degree polynomial $a_{normal} \cdot I_{int}^3 + b_{normal} \cdot I_{int}$, where the constants $a_{normal} \leq a_{ramp}$, and $b_{normal} \leq b_{ramp}$. This yields a larger droop during the ramp than during normal operation of the SMPS 300.

The reference voltage signal generator 31 may be configured to control at least a part of the ramp based on the first and second functions and the current indicator signal $S_I$, such that the control signal $S_C$ generated by the switching control signal generator 23 (or the output voltage $V_{out}$) changes continuously at the end of the ramp. For example, the reference voltage signal generator 31 may, as in the present embodiment, be configured to adjust a rate at which the reference voltage signal $S_{ref}$ changes with time during a final part of the ramp (i.e. in an end portion of the ramp) using the first and second functions and the current indicator signal $S_I$, such that the error signal $S_{error}$ generated by the error signal generator 24 changes continuously at the end of the ramp. To do this, the reference voltage signal generator 31 may evaluate the first and second functions at a value of the current $I_{int}$ indicated in the current indicator signal $S_I$ (or a mean of multiple received values of $S_I$), and calculate the difference between the evaluated values of the two droop functions to determine the rate at which the reference voltage signal $S_{ref}$ is to change with time during the final part of the ramp (e.g. the final two thirds, half, third, fifth or tenth of the ramp). Alternatively, an initial (rather than final) part of the ramp, or an intermediate part of the ramp lying between an initial part and a final part, may be controlled in a similar way.

Figure 5:
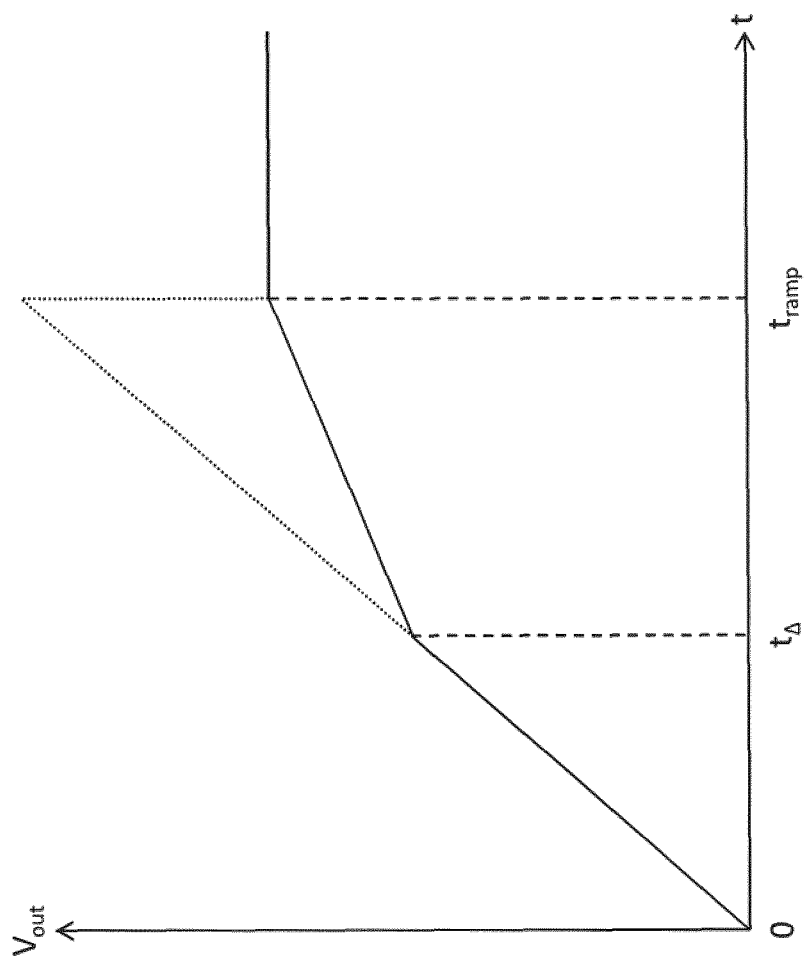
FIG. 5 is a schematic illustration of how the output voltage of an SMPS according to an embodiment varies during and after a ramp of the output voltages, where the voltage is ramped up at two different rates in respective parts of the ramp.

An example of how the ramp rate may be controlled by the reference voltage signal generator 31 will now be described in more detail with reference to FIG. 5. In this example, the reference voltage signal generator 31 ramps the reference voltage signal $S_{ref}$ (hence the output voltage $V_{out}$ of the SMPS 300) from time t=0 to $t_{ramp}$, whilst the output voltage of the SMPS 300 is regulated using the first droop function. From time $t=t_{ramp}$ onwards, the reference voltage signal generator 31 maintains the reference voltage signal $S_{ref}$ at a constant value, and the controller 30 regulates the output voltage of the SMPS 300 using the second droop function. From time t=0 to $t_A$, the reference voltage signal generator 31 ramps up the reference voltage signal $S_{ref}$ at a first rate. At some time before time $t=t_A$, the reference voltage signal generator 31 evaluates the first and second droop functions at a value of the current $I_{int}$ indicated in the current indicator signal $S_I$ (or a mean of received values of $S_I$), and calculates the difference between the evaluated values of the droop functions to determine the rate at which the reference voltage signal $S_{ref}$ should be ramped up during the remaining part of the ramp (i.e. from time $t=t_A$ to $t_{ramp}$) in order to ensure that the error signal $S_{error}$, hence the output voltage $V_{out}$ the SMPS 300, changes continuously at time $t=t_{ramp}$, as shown by the solid curve in FIG. 5. If no adjustment to the ramp rate is made, the output voltage variation illustrated by the dotted curve in FIG. 5 may be observed, where the output voltage $V_{out}$ changes discontinuously, with a step-like change, at time $t=t_{ramp}$ when the controller 30 switches from using the first droop function to using the second droop function. Such an abrupt change in the error signal $S_{error}$, hence $V_{out}$, at time $t=t_{ramp}$ may cause transients in either the load current or output voltage of the SMPS 300. It should be noted that the increase in the reference voltage signal $S_{ref}$ (hence $V_{out}$) over time during one or both of the portions of the ramp discussed above need not be linear.

The coordination of the droop control signal generator's switch-over from using the first droop function to using the second droop function, with the reference voltage signal generator's switch-over (at time $t=t_{ramp}$) from ramping the reference voltage signal $S_{ref}$ to maintaining $S_{ref}$ at a constant value, may be achieved in any suitable or desirable way. In the present embodiment, the reference voltage signal generator 31 and the droop control signal generator 32 are communicatively coupled to exchange status information (e.g. "ramping", "ramp complete" etc.), allowing them to coordinate their operations in the way described above.

Figure 6:
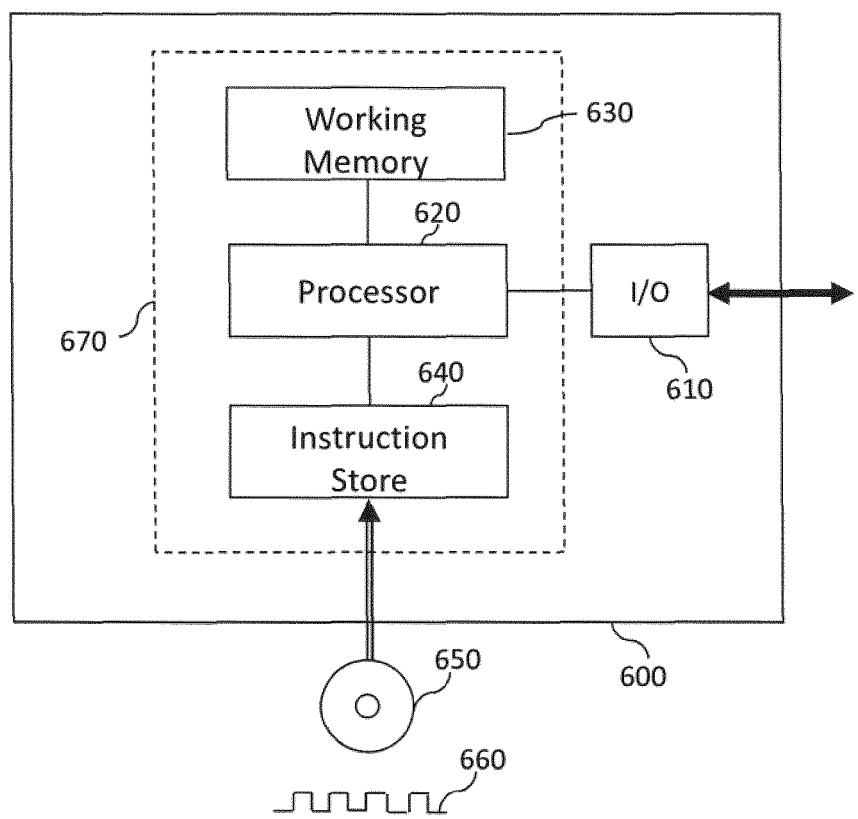
FIG. 6 shows an exemplary hardware implementation of the SMPS controller illustrated in FIG. 4.

FIG. 6 shows an exemplary implementation of the PWM controller 30, in programmable signal processing hardware. The signal processing apparatus 600 shown in FIG. 6 comprises an input/output (I/O) section 610 for receiving the current indicator signal $S_I$ and the voltage indicator signal $S_{Vout}$, and for transmitting the generated switching control signal $S_C$ to the voltage conversion circuit 10 (or to an intermediate switching element drive circuit, if one is provided), to control the switching of the SMPS 300. The signal processing apparatus 600 further comprises a processor 620, a working memory 630 and an instruction store 640 storing computer-readable instructions which, when executed by the processor 620, cause the processor 620 to perform the processing operations hereinafter described to control the switching of the SMPS 300 to regulate the SMPS's output voltage $V_{out}$ during and after the ramping of $V_{out}$. The instruction store 640 may comprise a ROM which is pre-loaded with the computer-readable instructions. Alternatively, the instruction store 640 may comprise a RAM or similar type of memory, and the computer-readable instructions can be input thereto from a computer program product, such as a computer-readable storage medium 650 such as a CD-ROM, etc. or a computer-readable signal 660 carrying the computer-readable instructions.

In the present embodiment, the combination 670 of the hardware components shown in FIG. 6, comprising the processor 620, the working memory 630 and the instruction store 640, is configured to implement the functionality of the aforementioned reference voltage signal generator 31, voltage droop control signal generator 32, and switching control signal generator 23, which will now be described in detail with reference to FIG. 7.

Figure 7:
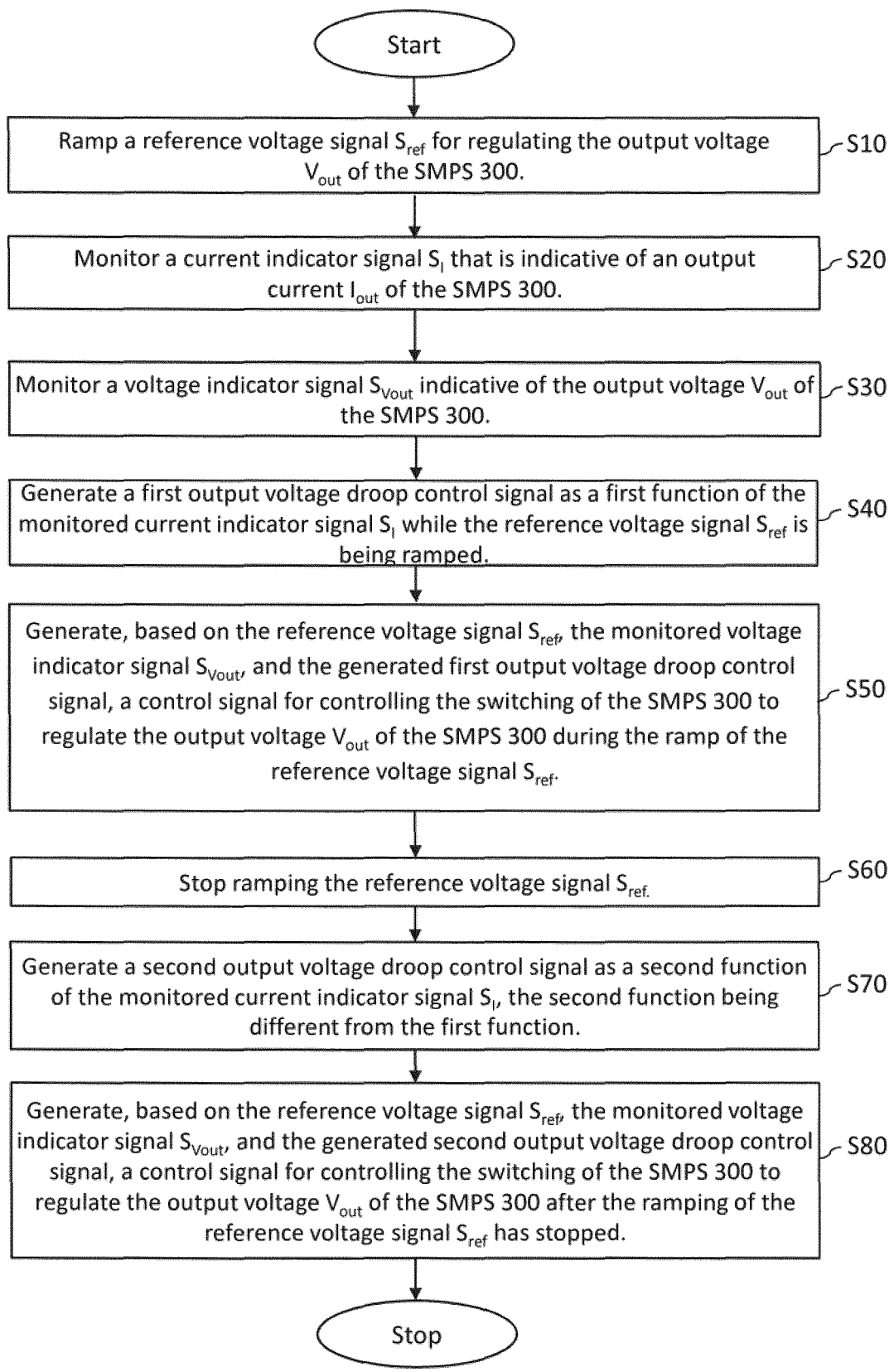
FIG. 7 is a flow diagram illustrating a process by which an SMPS controller of an embodiment generates a control signal for controlling the SMPS to regulate the output voltage of the SMPS during and after an output voltage ramp.

FIG. 7 is a flow chart illustrating a process by which the controller 30 generates the control signal $S_C$ for controlling the switching of the SMPS 300 both during and after the ramping of the output voltage $V_{out}$ of the SMPS 300 in the present embodiment.

In step S10, the reference voltage signal generator 31 starts to ramp the reference voltage signal $S_{ref}$ for regulating the output voltage $V_{out}$ of the SMPS 300. The reference voltage signal generator 31 may, as in the present embodiment, ramp the reference voltage signal $S_{ref}$ up to a predetermined value during start-up of the SMPS 300, and then maintain it at the predetermined value during subsequent operation of the SMPS 300.

In step S20, the voltage droop control signal generator 32 starts to monitor the current indicator signal $S_I$ that is indicative of the output current $I_{out}$ of the SMPS 300.

In step S30, the switching control signal generator 23 (specifically, the error signal generator 24 thereof) starts to monitor the voltage indicator signal $S_{Vout}$ that is indicative of the output voltage $V_{out}$ of the SMPS 300.

In step S40, the voltage droop control signal generator 32 generates a first output voltage droop control signal as a first function of the monitored current indicator signal $S_I$ while the reference voltage signal $S_{ref}$ is being ramped.

In step S50, the switching control signal generator 23 generates, based on the reference voltage signal $S_{ref}$, the monitored voltage indicator signal $S_{Vout}$, and the generated first output voltage droop control signal, a control signal for controlling the switching of the SMPS 300 to regulate the output voltage $V_{out}$ of the SMPS 300 during the ramp of the reference voltage signal $S_{ref}$.

In step S60, the reference voltage signal generator 31 stops ramping the reference voltage signal $S_{ref}$.

In step S70, the voltage droop control signal generator 32 generates a second output voltage droop control signal as a second function of the monitored current indicator signal $S_I$, the second function being different from the first function. The first and second droop functions are as described above.

Finally, in step S80, the switching control signal generator 23 generates, based on the reference voltage signal $S_{ref}$, the monitored voltage indicator signal $S_{Vout}$, and the generated second output voltage droop control signal, a control signal for controlling the switching of the SMPS 300 to regulate the output voltage $V_{out}$ of the SMPS 300 after the ramping of the reference voltage signal $S_{ref}$ has finished.

The reference voltage signal generator 31 may, as in the present embodiment, control at least a part of the ramp based on the first and second functions and the monitored current indicator signal $S_I$, such that the control signal $S_C$ generated by the switching control signal generator 23 changes continuously at the end of the ramp.

EXPERIMENTAL RESULTS

Figure 8:
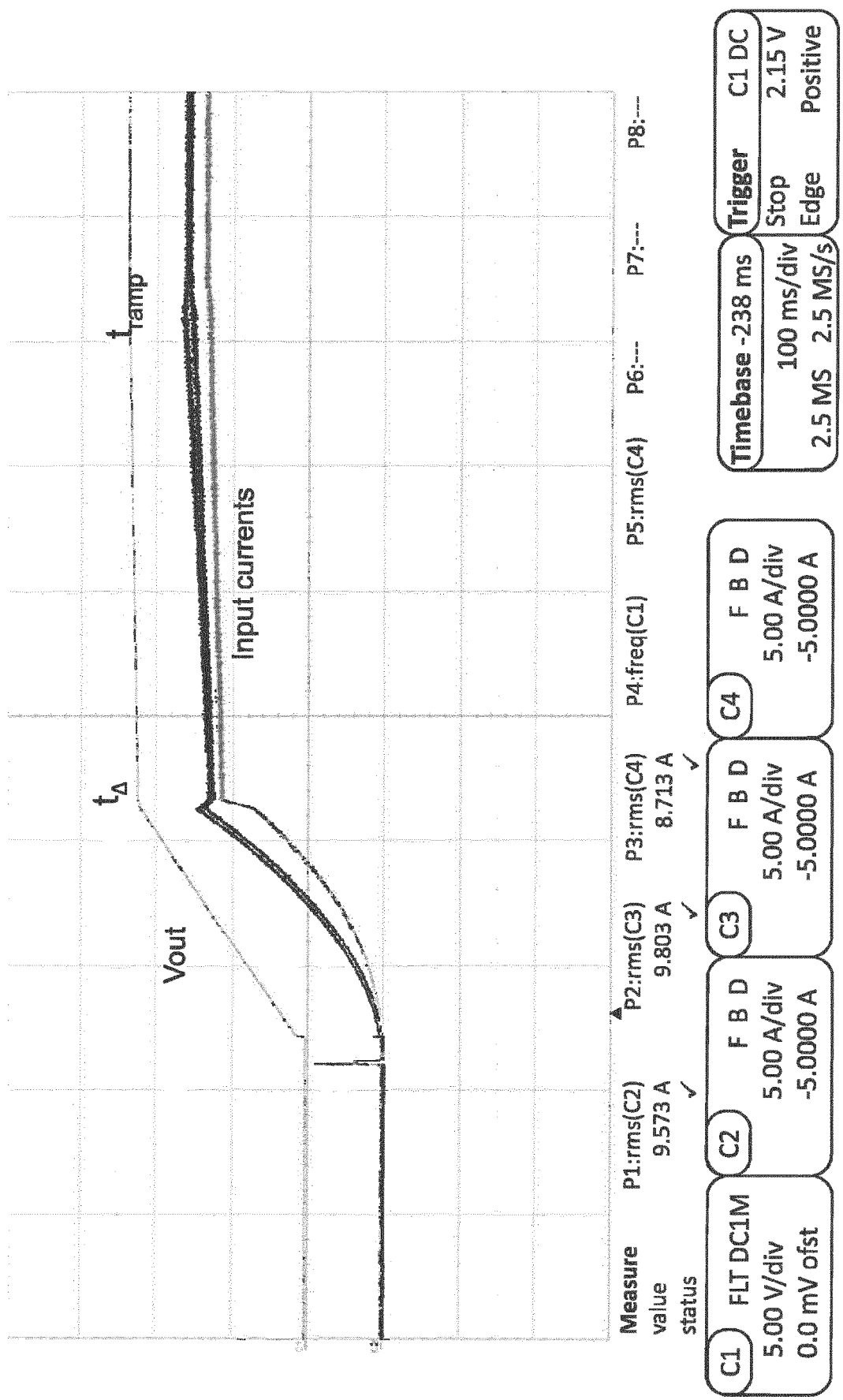
FIG. 8 shows measurements of non-linear droop during and after a voltage ramp of a power supply system having three paralleled SMPSs according to embodiments of the present invention.

FIG. 8 shows the results of a measurement with three paralleled SMPSs ramping up towards a resistive load of a total of 162 A. In order to simplify the measurement, the input current to each SMPS is measured. The voltage reference of one of the SMPSs was intentionally set to be 100 mV lower than the others, in order to simulate an error in the voltage reference, and the ramp-up time for that SMPS was 8% longer, increased from 206 ms to 223 ms. This resulted in that SMPS consuming less current than the other two. However, the current difference is small during the ramp, and even smaller during normal operation due to the droop.

MODIFICATIONS AND VARIATIONS

Many modifications and variations can be made to the embodiments described above.

For example, although the power supply system 200 of the above embodiment employs SMPSs 300-1 to 300-N in the form of DC/DC converters, it will be appreciated that the droop control techniques described herein are not limited to SMPSs of this kind and a power supply having such SMPSs. For example, in another embodiment, the SMPS 300 for use in the power supply system 200 may be provided in the form of an AC/DC converter, for example. Moreover, the power supply system 200 may comprise one or more such AC/DC converters and one or more such DC/DC converters.

Furthermore, although each of the SMPSs 300-1 to 300-N in the power supply system 200 constitutes an embodiment of the present invention, not all of the SMPSs in the power supply system 200 need take this form. In this case, the power supply system may still exhibit more balanced output current sharing during output voltage ramp than a power supply system having conventional SMPSs as described above. However, the power supply system 200 of the above embodiment, in which all of the SMPSs 300-1 to 300-N use one droop function during the output voltage ramp and another (different) droop function during subsequent operation, may be more effective in preventing the circulation of current from one SMPS in the system to another during the output voltage ramp.

Although the controller 30 in the above embodiment includes a PID regulator 25, it will be appreciated that the regulator 25 may alternatively be configured to regulate the switching duty cycle of the SMPS 300 based on one or more, but not all, of the proportional (P), integral (I) and derivative (D) control parameters.

Furthermore, in the above embodiment, the controller 30 is provided in the form of a PWM controller. However, the controller 30 may alternatively take the form of a frequency modulator, which controls the output voltage of the SMPS 300 by varying the frequency used in the voltage conversion circuit 10.

Furthermore, the controller 30 (or any described component thereof) need not be implemented in digital signal processing hardware, as described above, but may alternatively be implemented as an analog circuit or a combination of an analog circuit and digital signal processing hardware, using techniques known to those skilled in the art.

To avoid the discontinuity in the error signal $S_{error}$ at the end of the ramp (at time $t=t_{ramp}$), the reference voltage signal generator 31 may alternatively be configured to firstly calculate, using the first and second functions and the current indicator signal $S_I$, an offset to be applied to the reference voltage signal $S_{ref}$ when the voltage droop control signal generator 32 starts to generate the output voltage droop control signal $S_{droop}$ as the second function of the received current indicator signal $S_I$ at the end of the ramp, such that the control signal $S_C$ generated by the switching control signal generator 23 changes continuously at the end of the ramp. The reference voltage signal generator 31 may apply the calculated offset to the reference voltage signal $S_{ref}$ after ramping the reference voltage signal $S_{ref}$ (i.e. at time $t=t_{ramp}$), and then ramp the applied offset to zero. In this variant, the output voltage $V_{out}$ will overshoot the target value that is to be achieved during normal operation of the SMPS 300, before subsequently decreasing to this target value, as the applied offset is gradually decreased to zero.

The invention claimed is:

1. A controller configured to control switching of a switched mode power supply (SMPS) to regulate an output voltage thereof, comprising:
   a reference voltage signal generator configured to generate a variable reference voltage signal for regulating the output voltage of the SMPS;
   a voltage droop control signal generator configured to receive a current indicator signal indicative of an output current of the SMPS, and generate an output voltage droop control signal in response to a first function and a second function of the current indicator signal, the first function of the current indicator signal being employed when the reference voltage signal generator ramps the variable reference voltage signal, and the second function of the current indicator signal being employed thereafter; and
   a switching control signal generator configured to receive a voltage indicator signal indicative of the output voltage of the SMPS, the switching control signal generator further configured to generate a control signal for controlling the switching of the SMPS to regulate the output voltage of the SMPS based on the voltage indicator signal, the variable reference voltage signal, and the output voltage droop control signal.

2. The controller as recited in claim 1, wherein the first function of the current indicator signal causes a greater output voltage droop for the output voltage than the second function of the current indicator signal.

3. The controller as recited in claim 1, wherein the first function and the second function of the current indicator signal are linear, and a first derivative of the first function is greater than a first derivative of the second function.

4. The controller as recited in claim 1, wherein at least one of the first function and the second function is non-linear.

5. The controller as recited in claim 1, wherein the first function of the current indicator signal is a first polynomial of order two or more and the second function of the current indicator signal is a second polynomial of order two or more, and wherein coefficients of the first polynomial and the second polynomial are configured so that the first function is greater than the second function for at least one value of the current indicator signal.

6. The controller as recited in claim 1, wherein the reference voltage signal generator is configured to ramp the variable reference voltage signal up to a predetermined value during a start-up of the SMPS, and to maintain the variable reference voltage signal at the predetermined value thereafter.

7. The controller as recited in claim 1, wherein the reference voltage signal generator is further configured to control at least a part of the ramping of the variable reference voltage signal based on the first function, the second function, and the current indicator signal, such that the control signal generated by the switching control signal generator changes continuously at an end of the ramping of the variable reference voltage signal.

8. The controller as recited in claim 1, wherein the reference voltage signal generator is further configured to:
   calculate an offset to be applied to the variable reference voltage signal using the first function, the second function, and the current indicator signal, so that the control signal remains continuous at an end of the ramping of the variable reference voltage signal;
   apply the offset to the variable reference voltage signal after ramping the variable reference voltage signal; and
   ramp the offset to zero.

9. A method of controlling switching of a switched mode power supply (SMPS) to regulate an output voltage thereof, comprising:
   ramping a reference voltage signal for regulating the output voltage of the SMPS;
   monitoring a current indicator signal indicative of an output current of the SMPS;
   monitoring a voltage indicator signal indicative of the output voltage;
   generating a first output voltage droop control signal as a first function of the current indicator signal while the reference voltage signal is being ramped;
   generating a control signal for the controlling the switching of the SMPS to regulate the output voltage based on the reference voltage signal, the voltage indicator signal, and the first output voltage droop control signal, during the ramping the reference voltage signal;
   ceasing the ramping the reference voltage signal;
   generating a second output voltage droop control signal as a second function of the current indicator signal, the second function being different from the first function; and
   generating a control signal for controlling the switching of the SMPS to regulate the output voltage after the ramping the reference voltage signal has ceased based on the reference voltage signal, the voltage indicator signal, and the second output voltage droop control signal.

10. The method as recited in claim 9, wherein the first function of the current indicator signal causes a greater output voltage droop for the output voltage than the second function of the current indicator signal.

11. The method as recited in claim 9, wherein the first function and the second function are linear, and a first derivative of the first function is greater than a first derivative of the second function.

12. The method as recited in claim 9, wherein at least one of the first function and the second function is non-linear.

13. The method as recited in claim 9, wherein the first function of the current indicator signal is a first polynomial of order two or more and the second function of the current indicator signal is a second polynomial of order two or more, and wherein coefficients of the first polynomial and the second polynomial are configured so that the first function is greater than the second function for at least one value of the current indicator signal.

14. The method as recited in claim 9, wherein the reference voltage signal is ramped up to a predetermined value during start-up of the SMPS, and is maintained at the predetermined value during subsequent operation of the SMPS.

15. The method as recited in claim 9, wherein at least a part of the ramping the reference voltage signal is controlled based on the first function and the second function and the current indicator signal, such that the control signal changes continuously at an end of the ramping of the variable reference voltage signal.

16. The method as recited in claim 9, further comprising:
calculating an offset to be applied to the reference voltage signal when generating the first and second output voltage droop control signals using the first function, the second function and the current indicator signal, such that the control signal changes continuously at an end of the ramping of the variable reference voltage signal;
applying the offset to the reference voltage signal after ramping the reference voltage signal; and
ramping the applied offset to zero.

17. A switched mode power supply (SMPS), comprising:
voltage conversion circuitry configured to convert an input voltage to an output voltage; and
a controller including a processor, configured to:
generate a variable reference voltage signal for regulating the output voltage of the SMPS;
receive a current indicator signal indicative of an output current of the SMPS;
generate an output voltage droop control signal in response to a first function and a second function of the current indicator signal, the first function of the current indicator signal being employed during a ramping of the variable reference voltage signal, and the second function of the current indicator signal being employed thereafter;
receive a voltage indicator signal indicative of the output voltage of the SMPS; and
generate a control signal for controlling the switching of the SMPS to regulate the output voltage of the SMPS based on the voltage indicator signal, the variable reference voltage signal, and the output voltage droop control signal.

18. The SMPS as recited in claim 17, wherein the processor is configured to ramp the variable reference voltage signal up to a predetermined value during a start-up of the SMPS, and to maintain the variable reference voltage signal at the predetermined value thereafter.

19. The SMPS as recited in claim 17, wherein the processor is further configured to control at least a part of the ramping of the variable reference voltage signal based on the first function, the second function, and the current indicator signal, such that the control signal changes continuously at an end of the ramping of the variable reference voltage signal.

20. The SMPS as recited in claim 17, wherein the processor is further configured to:
calculate an offset to be applied to the variable reference voltage signal using the first function, the second function, and the current indicator signal, so that the control signal remains continuous at an end of the ramping of the variable reference voltage signal;
apply the offset to the variable reference voltage signal after ramping the variable reference voltage signal; and
ramp the offset to zero.

* * * * *